United States Patent
Hsu et al.

(10) Patent No.: US 11,946,593 B2
(45) Date of Patent: Apr. 2, 2024

(54) GREASE INJECTION SYSTEM

(71) Applicant: DORCAS SHIN CO., LTD, Taoyuan (TW)

(72) Inventors: Ming-Tan Hsu, Taoyuan (TW); Xin-Xin Lin, Taoyuan (TW); Li-Hsiang Sun, Taoyuan (TW); Wen-Chi Hsieh, Taoyuan (TW)

(73) Assignee: DORCAS SHIN CO., LTD, Taoyuan (TW)

( * ) Notice: Subject to any disclaimer, the term of this patent is extended or adjusted under 35 U.S.C. 154(b) by 0 days.

(21) Appl. No.: 17/901,833

(22) Filed: Sep. 1, 2022

(65) Prior Publication Data
US 2023/0075212 A1  Mar. 9, 2023

(30) Foreign Application Priority Data
Sep. 8, 2021 (TW) ................. 110210650

(51) Int. Cl.
*F16N 3/10* (2006.01)
*F16N 11/08* (2006.01)

(52) U.S. Cl.
CPC ................ *F16N 3/10* (2013.01); *F16N 11/08* (2013.01); *F16N 2230/02* (2013.01); *F16N 2270/00* (2013.01)

(58) Field of Classification Search
CPC ........ F16N 3/10; F16N 11/08; F16N 2230/02; F16N 2270/00
See application file for complete search history.

(56) References Cited

U.S. PATENT DOCUMENTS

| | | | |
|---|---|---|---|
| 9,353,908 B2 | 5/2016 | Kuvaja et al. | |
| 9,500,317 B2* | 11/2016 | Peters | F16N 3/12 |
| 2002/0063018 A1* | 5/2002 | Schippers | F16N 29/02 |
| | | | 184/15.1 |
| 2004/0250623 A1* | 12/2004 | Walker | F16C 33/102 |
| | | | 73/593 |
| 2017/0030517 A1* | 2/2017 | Willems | G01F 15/068 |
| 2019/0040998 A1* | 2/2019 | Wride | F16N 29/04 |
| 2019/0090106 A1* | 3/2019 | Salvatore | H04W 4/38 |
| 2019/0257360 A1* | 8/2019 | Meenakshisundaram | |
| | | | F16C 33/6625 |
| 2019/0266721 A1* | 8/2019 | Gibson | F16N 3/10 |
| 2020/0063719 A1* | 2/2020 | Madsen | G05D 7/0676 |

FOREIGN PATENT DOCUMENTS

| | | |
|---|---|---|
| TW | M328918 | 3/2008 |
| TW | M564113 | 7/2018 |

* cited by examiner

*Primary Examiner* — Michael R Mansen
*Assistant Examiner* — Mark K Buse
(74) *Attorney, Agent, or Firm* — JCIPRNET

(57) ABSTRACT

Provided is a grease injection system including a plurality of grease injection devices and a host. The grease injection devices uses control information to output lubricating grease, and output a plurality of pieces of status information. The host receives the pieces of status information from the grease injection devices, and generates the control information based on the pieces of status information.

10 Claims, 5 Drawing Sheets

GREASE INJECTION SYSTEM

CROSS-REFERENCE TO RELATED APPLICATION

This application claims the priority benefit of Taiwan application serial no. 110210650, filed on Sep. 8, 2021. The entirety of the above-mentioned patent application is hereby incorporated by reference herein and made a part of this specification.

BACKGROUND

Technical Field

The disclosure relates to a grease injection system, particularly to a grease injection system for remote detection and remote control of multiple grease injection devices.

Description of Related Art

As a grease injection device provides timely and suitable amount of lubricating grease to the target object to operate normally, it is critical to maintain the status of the grease injection device. Nevertheless, the increase in the number of grease injection devices also poses difficulty to detect the status of these devices and control the same according to the status.

SUMMARY

The disclosure provides a grease injection system capable of detecting the status of a plurality of grease injection devices and performing proper control on the grease injection devices individually after analyzing the status according to the grease injection devices.

The grease injection system of the disclosure includes a plurality of grease injection devices and a host. Each of the grease injection devices includes a grease injection element, a grease injection communication element, and a grease injection control element. The grease injection communication element receives control information. The grease injection control element is coupled to the grease injection element and the grease injection communication element. The grease injection control element controls the grease injection element with the control information to output lubricating grease, detects the operational status of the grease injection element to provide status information, and controls the grease injection communication element to output the status information. The host communicates bidirectionally with the grease injection devices. The host receives multiple pieces of status information from the grease injection devices, and generates multiple corresponding pieces of control information based on the pieces of status information.

In an embodiment of the disclosure, the grease injection communication element is in wired or wireless communication with the host.

In an embodiment of the disclosure, each of the grease injection devices further includes a first input element and a first display element. The first input element is coupled to the grease injection control element and operated to provide an input command. The first display element is coupled to the grease injection control element and is configured to display information corresponding to at least one of the status information and the input command.

In one embodiment of the disclosure, the grease injection control element controls the grease injection communication element to provide the input command to the host.

In an embodiment of the disclosure, the grease injection system further includes a forwarding device corresponding to at least one grease injection device of the grease injection devices. The forwarding device forwards at least one of at least one status information and at least one input command from the at least one grease injection device to the host, and forwards at least one control information from the host to the at least one grease injection device In an embodiment of the disclosure, the forwarding device includes a first forwarding communication element, a second forwarding communication element, and a forwarding control element. The first forwarding communication element is in wired or wireless communication with a corresponding grease injection device group of at least one grease injection device group. The second forwarding communication element is in wired or wireless communication with the host. The forwarding control element is coupled to the first forwarding communication element and the second forwarding communication element. The forwarding control element receives the control information corresponding to the corresponding grease injection device group from the host through the second forwarding communication element, and controls the first forwarding communication element to send control information corresponding to the corresponding grease injection device group to the corresponding grease injection device group.

In an embodiment of the disclosure, the forwarding control element receives at least one of the status information and the input command from the corresponding grease injection device group through the first forwarding communication element, and controls the second forwarding communication element to send at least one of the status information and the input command to the host.

In an embodiment of the disclosure, the forwarding device further includes a second input element coupled to the forwarding control element and operated to provide a forwarding setting command.

In an embodiment of the disclosure, the forwarding control element assigns at least one group of the grease injection devices as the corresponding grease injection device group based on the forwarding setting command.

In an embodiment of the disclosure, the forwarding device further includes a second display element coupled to the forwarding control element. The second display element displays information corresponding to the forwarding setting command.

In an embodiment of the disclosure, the communication range of the first grease injection device of the grease injection devices covers the communication ranges of the host and a second grease injection device of the grease injection devices. The first grease injection device forwards control information from the host to the second grease injection device, and forwards status information of the second grease injection device to the host.

Based on the above, the grease injection system includes a plurality of grease injection devices and a host. The grease injection devices use control information to output lubricating grease, and output multiple pieces of status information. The host receives the pieces of status information from the grease injection devices, and generates multiple pieces of corresponding control information based on the pieces of status information. In this way, the grease injection system is able to detect remotely the status of the grease injection devices and control remotely the grease injection devices according to the status of the grease injection devices.

DESCRIPTION OF THE EMBODIMENTS

Figure 1:
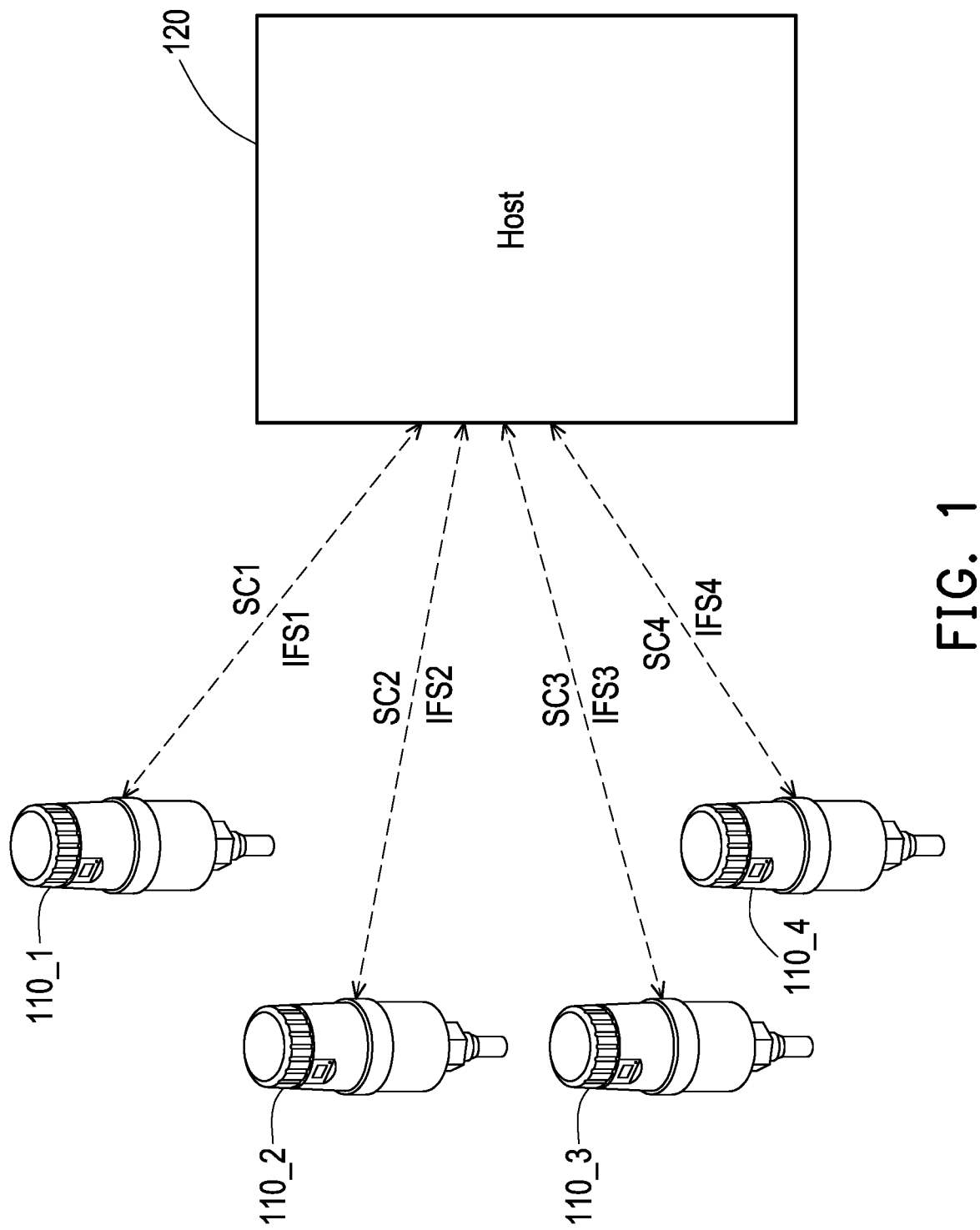
FIG. 1 is a schematic diagram of a grease injection system according to a first embodiment of the disclosure.

Reference is made hereinafter in detail to the embodiments of the disclosure, examples of which are illustrated in the drawings. Wherever possible, the same reference numerals in the drawings and the main text refer to the same or similar parts.

Please refer to FIG. 1. FIG. 1 is a schematic diagram of a grease injection system according to a first embodiment of the disclosure. The grease injection system 100 includes grease injection devices 110_1 to 110_4 and a host 120. The host 120 communicates bidirectionally with the grease injection devices 110_1 to 110_4, and the grease injection devices 110_1 to 110_4 respectively communicate with the host 120. The grease injection devices 110_1 to 110_4 use control information SC1 to SC4 to output lubricating grease respectively, and detect their own operational status to provide status information IFS1 to IFS4 corresponding to the operational status. For example, the grease injection device 110_1 uses the control information SC1 to output lubricating grease, and provides the status information IFS1 corresponding to the operational status. The grease injection device 110_2 uses the control information SC2 to output lubricating grease, and provides the status information IFS2 corresponding to the operational status, and the rest may be deduced therefrom.

In this embodiment, the grease injection devices 110_1 to 110_4 respectively output the status information IFS1 to IFS4 to the host 120. Therefore, the host 120 learns the operational status of the grease injection devices 110_1 to 110_4 based on the status information IFS1 to IFS4. The host 120 generates corresponding control information SC1 to SC4 based on the status information IFS1 to IFS4. For example, the grease injection device 110_1 outputs lubricating grease based on the current control information SC1, and provides the status information IFS1 corresponding to the operational status. When the host 120 determines based on the status information IFS1 that the grease injection condition of the grease injection device 110_1 is in need of adjustment, the host 120 provides the corrected control information SC1 to the grease injection device 110_1. Therefore, the grease injection device 110_1 adjusts the grease injection parameters (e.g., the grease injection amount or the grease injection cycle) of the grease injection device 110_1 based on the corrected control information SC1. For another example, when the host 120 determines based on the status information IFS1 that the grease injection amount of the grease injection device 110_1 is abnormal, the host 120 provides the corrected control information SC1 to the grease injection device 110_1, such that the grease injection device 110_1 stops running and provides corresponding warning information. For example, when the host 120 determines based on the status information IFS1 that the grease level of the grease injection device 110_1 is lower than a default level, the host 120 provides corresponding warning information.

Note that the grease injection devices 110_1 to 110_4 respectively use the control information SC1 to SC4 to output lubricating grease, and detect their own operational status to provide status information IFS1 to IFS4 corresponding to the operational status. The host 120 generates corresponding control information SC1 to SC4 based on the status information IFS1 to IFS4 to control the grease injection devices 110_1 to 110_4. As such, the grease injection system 100 is able to detect the status of the grease injection devices 110_1 to 110_4, and controls the grease injection devices 110_1 to 110_4 after analyzing the status of the grease injection devices 110_1 to 110_4. In this embodiment, the formats of the control information SC1 to SC4 and the formats of the status information IFS1 to IFS4 are respectively data signal formats transmittable between the devices, such as data streams.

In this embodiment, the host 120 is implemented by an electronic device with computing capability. The host 120 may be a personal computer, server, notebook computer, smartphone, or tablet computer.

The number of grease injection devices in the disclosure may be multiple. For the convenience of description, four grease injection devices are taken as an example in this embodiment, but the disclosure is not limited thereto.

Figure 2:
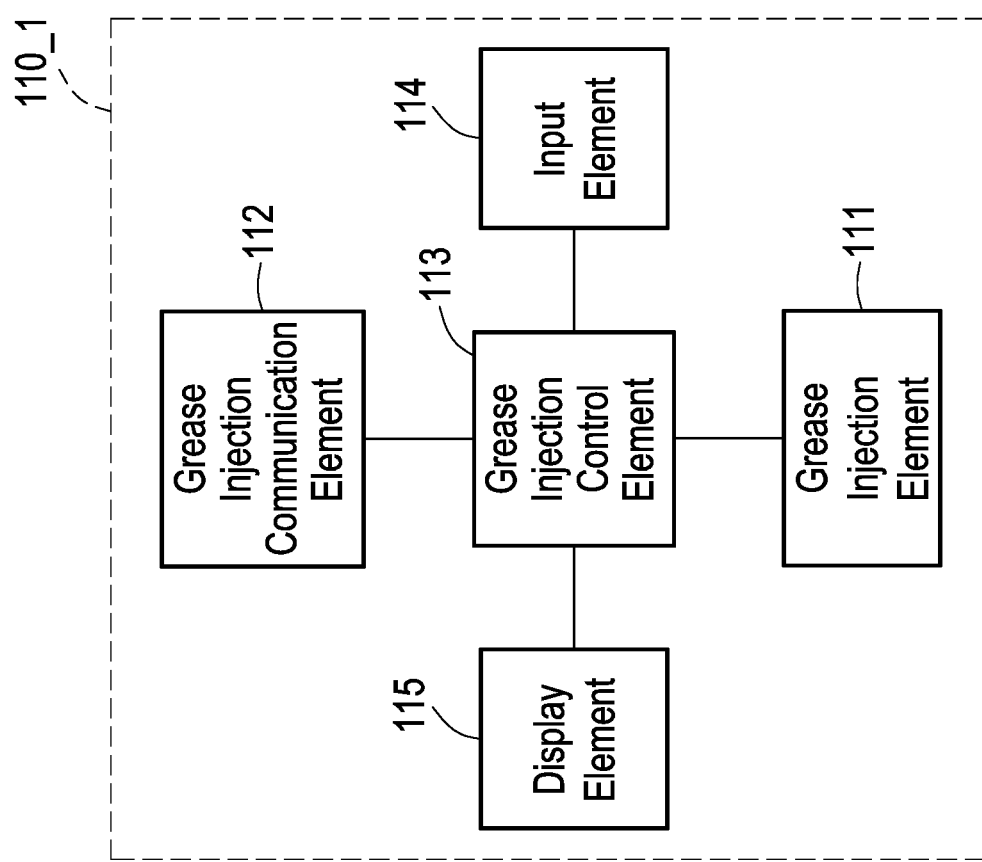
FIG. 2 is a schematic diagram of a grease injection device according to the first embodiment of the disclosure.

Please refer to FIG. 1 and FIG. 2 at the same time. FIG. 2 is a schematic diagram of a grease injection device according to an embodiment of the disclosure. In this embodiment, the grease injection device 110_1 includes a grease injection element 111, a grease injection communication element 112, and a grease injection control element 113. The grease injection element 111 has the function of outputting lubricating grease. The grease injection communication element 112 receives the control information SC1. The grease injection control element 113 is coupled to the grease injection element 111 and the grease injection communication element 112. The grease injection control element 113 uses the control information SC1 to control the grease injection element 111 to output lubricating grease. The grease injection control element 113 adjusts the grease injection parameters of the grease injection element 111 based on the control information SC1. The grease injection control element 113 activates or deactivates the grease injection element 111 based on the control information SC1. In addition, the grease injection control element 113 detects the operational status of the grease injection element 111 to provide status information IFS1, and controls the grease injection communication element 112 to output the status information IFS1. As the grease injection communication element 112 is in wired or wireless communication with the host 120, the host 120 receives the status information IFS1 output by the grease injection communication element 112, generates corresponding control information SC1 based on the status information IFS1, and provides the control information SC1 to the grease injection communication element 112.

In this embodiment, the grease injection communication element 112 is in wireless communication with the host 120. The grease injection communication element 112 may communicate with the host 120 using the fourth-generation mobile communication technology (4G), the fifth-generation mobile communication technology (5G), or other long-distance communication technology. In this way, data with a larger amount may be transmitted between the grease injection communication element 112 and the host 120. In addition, the transmission range is also larger. Based on the features above, the grease injection system 100 covers different locations. In other words, the host 120 may be connected to multiple grease injection devices in different locations, and control or operate those grease injection devices in different locations.

In this embodiment, the grease injection control element 113 is, for example, a central processing unit (CPU), or other programmable general-purpose or special-purpose microprocessors, digital signal processors (DSPs), programmable controllers, Application Specific Integrated Circuits (ASICs), Programmable Logic Devices (PLDs), other similar devices, or a combination thereof that can load and execute computer programs.

In some embodiments, the grease injection communication element 112 is in wired communication with the host 120. The grease injection communication element 112 may communicate with the host 120 by, for example, Ethernet, Modbus, and Universal Serial Bus (USB).

In this embodiment, the grease injection device 110_1 further includes an input element 114 and a display element 115. The input element 114 is coupled to the grease injection control element 113 and is operated to provide input commands. In this embodiment, the input element 114 is disposed on the operation interface of the grease injection device 110_1. The user may operate the input element 114 as needed, such that the input element 114 provides input commands. As the input commands may be associated with grease injection parameters, the grease injection control element 113 is able to control the grease injection element 111 according to the input command. In addition, the grease injection control element 113 also controls the grease injection communication element 112 to provide an input command to the host 120. In this way, the host 120 may know that the grease injection device 110_1 has been controlled by the input command. In some embodiments, the host 120 modifies the control information SC1 according to the input command. In other words, the control that the host 120 has over the grease injection devices 110_1 to 110_4 may be changed based on the operation of the input element 114.

The display element 115 is coupled to the grease injection control element 113. The display element 115 displays information corresponding to at least one of the status information IFS1 and the input command. The display element 115 may be a liquid crystal display (LCD), at least one light-emitting diode (LED), at least one seven-segment display, an organic light-emitting diode (OLED), or other component that has the function of display.

Figure 3:
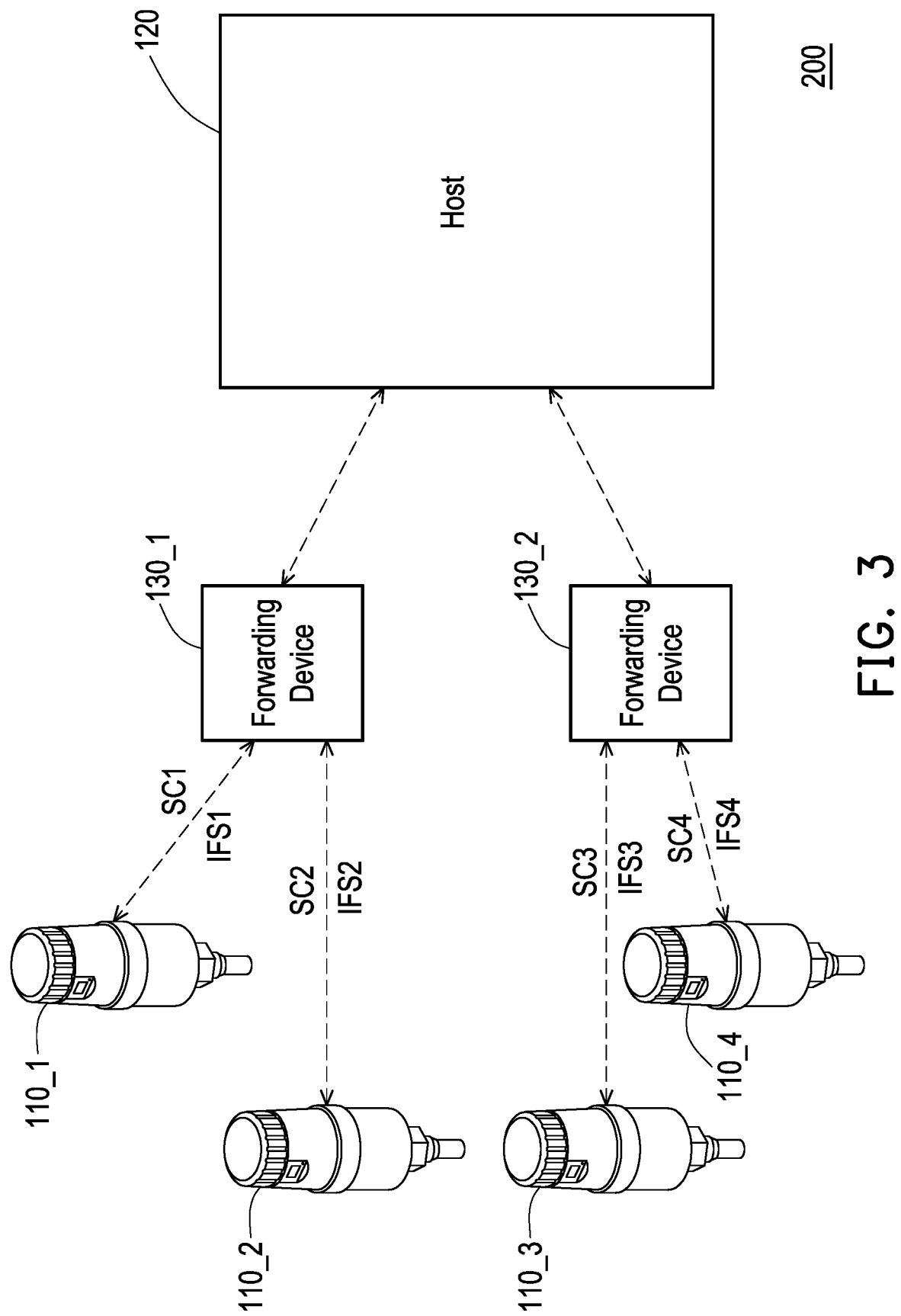
FIG. 3 is a schematic diagram of a grease injection system according to a second embodiment of the disclosure.

Please refer to FIG. 3, which is a schematic diagram of a grease injection system according to a second embodiment of the disclosure. In this embodiment, the grease injection system 200 includes grease injection devices 110_1 to 110_4, a host 120, and forwarding devices 130_1 and 130_2. In this embodiment, the forwarding devices 130_1 and 130_2 respectively correspond to at least one of the grease injection devices 110_1 to 110_4. The grease injection devices 110_1 to 110_4 may be grouped into at least one grease injection device group. For example, in this embodiment, the grease injection devices 110_1 and 110_2 are grouped into a first grease injection device group, and the grease injection devices 110_3 and 110_4 are grouped into a second grease injection device group. The forwarding device 130_1 corresponds to the first grease injection device group, and the forwarding device 130_2 corresponds to the second group of grease injection devices. In other words, the forwarding 130_1 corresponds to the grease injection devices 110_1 and 110_2, while the forwarding device 130_2 corresponds to the grease injection devices 110_3 and 110_4. For example, the forwarding device 130_1 and the first grease injection device group are in the first location. The forwarding device 130_2 and the second group of grease injection devices are in the second location.

In this embodiment, the forwarding device 130_1 forwards at least one of the status information IFS1 and IFS2 of the first grease injection device group and a plurality of input commands to the host 120. The forwarding device 130_2 forwards at least one of the status information IFS3 and IFS4 of the second grease injection device group and a plurality of input commands to the host 120. In addition, the forwarding device 130_1 forwards the control information SC1 and SC2 from the host 120 to the first grease injection device group, and the forwarding device 130_2 forwards the control information SC3 and SC4 from the host 120 to the second grease injection device group.

The number of grease injection device groups and the number of forwarding devices may be one or more in the disclosure. For the convenience of description, the numbers of the grease injection device group and the forwarding devices in this embodiment are respectively two for example, but the disclosure is not limited thereto. In addition, the grease injection device of the grease injection device group may be changed as needed, and is not limited thereto.

Figure 4:
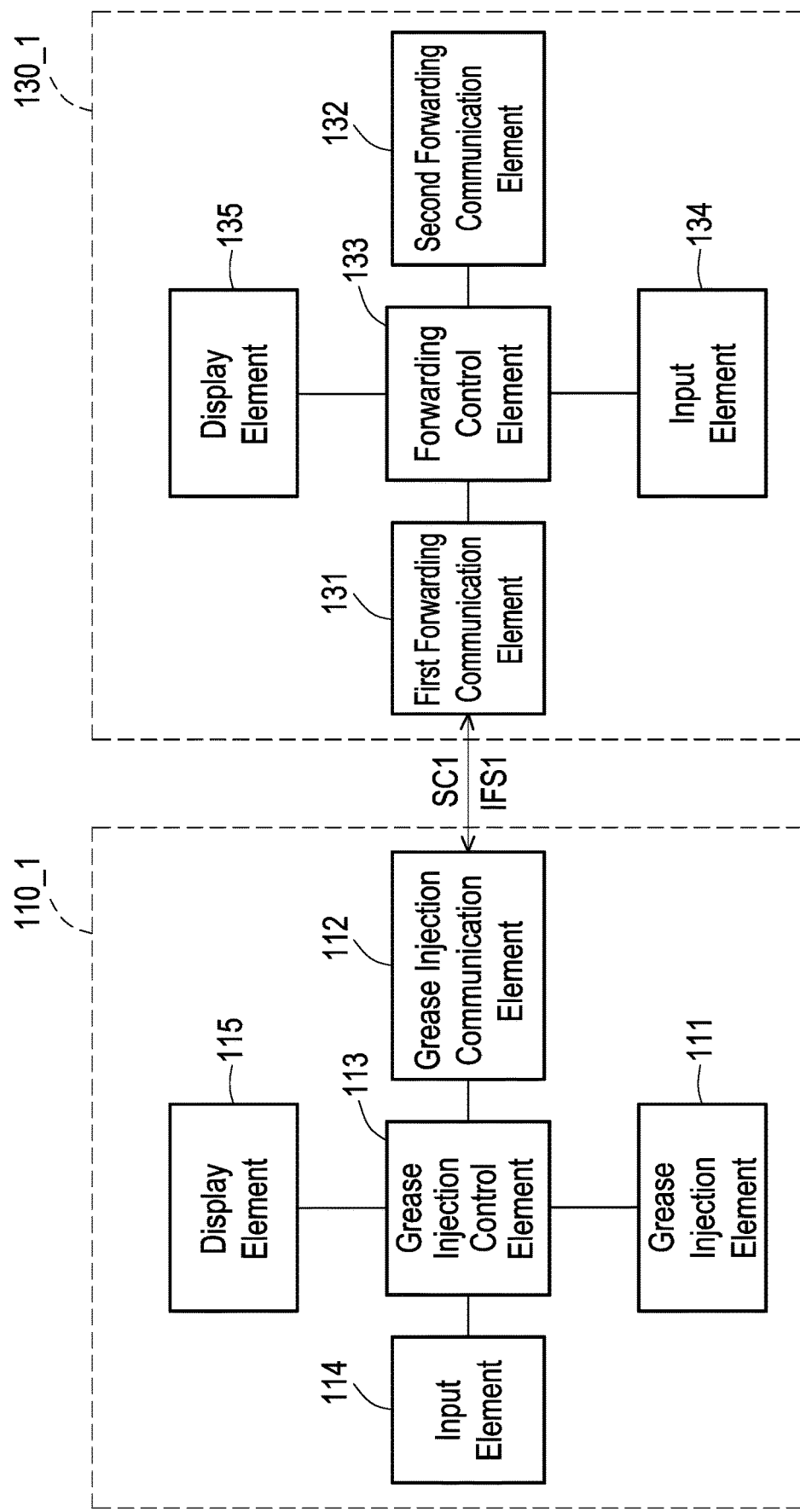
FIG. 4 is a schematic diagram of a grease injection device and a forwarding device according to the second embodiment of the disclosure.

Please refer to FIG. 3 and FIG. 4 at the same time. FIG. 4 is a schematic diagram of a grease injection device and a forwarding device according to an embodiment of the disclosure. In this embodiment, the forwarding device 130_1 includes a first forwarding communication element 131, a second forwarding communication element 132, and a forwarding control element 133. The first forwarding communication element 131 is in wired or wireless communication with a corresponding grease injection device group (e.g., the first grease injection device group). For example, the first forwarding communication element 131 adopt near-field communication (NFC), Bluetooth, Bluetooth Low Energy (BLE), ZigBee, Wi-Fi, LoRa (Long Range), or other technique to communicate wirelessly with the grease injection communication element 112. The first forwarding communication element 131 is also in wired communication with the grease injection communication element 112 through RS232, Ethernet, Modbus, USB, or the like.

In this embodiment, the second forwarding communication element 132 is in wired or wireless communication with the host 120. For example, the second forwarding communication element 132 is in long-distance wireless communication with the host 120 through 4G, 5G, or the like. The second forwarding communication element 132 may also perform long-distance wired communication with the host 120 through Ethernet, Modbus, or the like.

In this embodiment, the forwarding control element 133 is coupled to the first forwarding communication element 131 and the second forwarding communication element 132. The forwarding control element 133 receives the control information SC1 and SC2 of the first grease injection device group from the host 120 through the second forwarding communication element 132, and controls the first forwarding communication element 131 to send the corresponding control information SC1 and SC2 to the first grease injection device group. For example, the first forwarding communication element 131 is controlled to provide the control information SC1 to the grease injection communication element 112 of the grease injection device 110_1. The first forwarding communication element 131 is controlled to send the control information SC2 to the grease injection device 110_2.

In this embodiment, the forwarding control element 133 receives at least one of the status information IFS1 and IFS2 and the input command from the first grease injection device group through the first forwarding communication element 131, and controls the second forwarding communication element 132 to send at least one of the status information IFS1 and IFS2 and the input command from the first grease injection device group to the host 120.

In this embodiment, the forwarding device 130_1 further includes an input element 134 and a display element 135. The input element 134 is coupled to the forwarding control element 133 and is operated to provide a forwarding setting command. The forwarding control element 133 is connected to the host 120 based on the forwarding setting command. In this embodiment, the input element 134 may be disposed on the operation interface of the forwarding device 130_1, and the user may operate the input element 134 as needed to provide a forwarding setting command. For example, the forwarding control element 133 performs the setting operation based on the forwarding setting command, and the forwarding control element 133 writes the device information (e.g., an identifier) of the host 120 into the forwarding device 130_1 based on the forwarding setting command. In addition, the forwarding control element 133 assigns one or more device groups of the grease injection devices 110_1 to 110_4 to be the first grease injection device group based on the forwarding setting command. The forwarding control element 133 writes the device information of the grease injection devices 110_1 and 110_2 into the forwarding device 130_1 based on the forwarding setting command. Therefore, once the forwarding device 130_1 is used, the forwarding device 130_1 is immediately connected to the host 120 and the grease injection devices 110_1 and 110_2.

In this embodiment, the display element 135 is coupled to the forwarding control element 133. The display element 135 displays information corresponding to the forwarding setting command.

Figure 5:
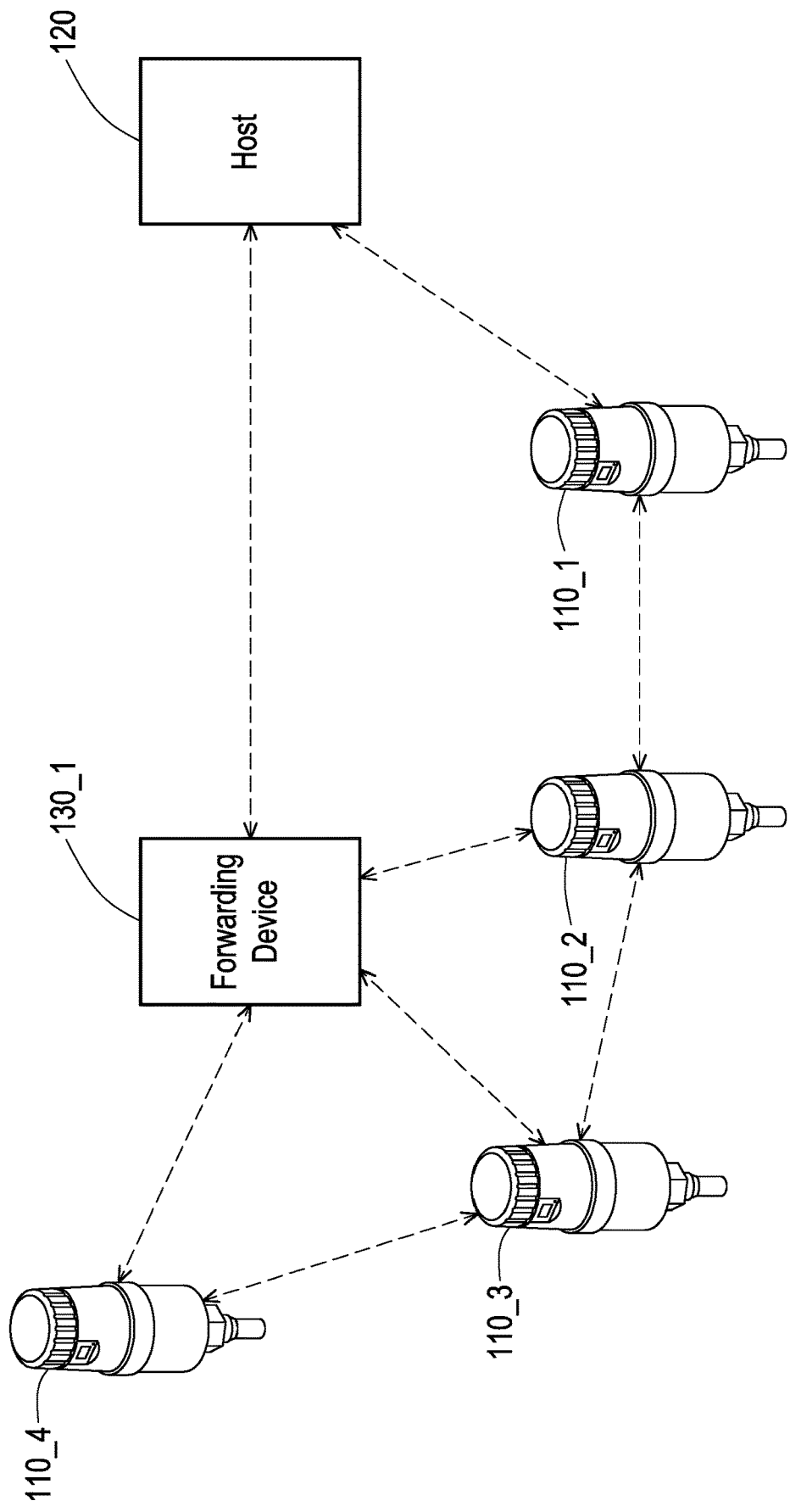
FIG. 5 is a schematic diagram of a grease injection system according to a third embodiment of the disclosure.

Please refer to FIG. 5, which is a schematic diagram of a grease injection system according to a third embodiment of the disclosure. In this embodiment, the grease injection system 300 includes grease injection devices 110_1 to 110_4, a host 120, and a forwarding device 130_1. In this embodiment, the communication range of the grease injection device 110_1 covers that of the host 120. Therefore, the grease injection device 110_1 is able to communicate with the host 120 without communicating through the forwarding device 130_1. As the communication range of the grease injection devices 110_2 to 110_4 cannot reach that of the host 120, the grease injection devices 110_2 to 110_4 need to communicate with the host 120 through the forwarding device 130_1. For example, the communication range of the grease injection devices 110_1 to 110_4 may depend on the communicable range of the grease injection communication element.

In this embodiment, the grease injection devices 110_1 to 110_4 respectively communicate with the adjacent grease injection devices bidirectionally through the grease injection communication element. For example, the communication range of the grease injection device 110_1 covers that of the grease injection device 110_2, such that the grease injection device 110_1 is able to forward the control information to the grease injection device 110_2 and forward the status information of the grease injection device 110_2 to the host 120. For another example, the communication range of the grease injection devices 110_1 and 110_2 covers that of the grease injection device 110_3. Therefore, the grease injection devices 110_1 and 110_2 are able to forward the control information to the grease injection device 110_3 and forward the status information of the grease injection device 110_3 to the host 120. For yet another example, the communication range of the grease injection devices 110_1 to 110_3 covers that of the grease injection device 110_4, such that the grease injection devices 110_1 to 110_3 are able to forward the control information to the grease injection device 110_4 and forward the status information of the grease injection device 110_4 to the host 120. In this way, when the forwarding device 130_1 operates abnormally, the grease injection devices 110_1 to 110_4 may perform the information forwarding function.

To sum up, the grease injection system of the disclosure includes a plurality of grease injection devices and a host. The grease injection devices adjust the lubrication parameters according to the control information, and output multiple pieces of status information. The host receives the status information from the grease injection devices, and generates multiple pieces of corresponding control information based on the status information. In this way, the grease injection system is able to detect the status of the grease injection devices and control the grease injection devices according to the status thereof.

It should be noted that the embodiments above only elucidate, and not to limit, the technical solutions of the disclosure. Although the disclosure has been described in detail with reference to the embodiments, person having ordinary skill in the art should understand that it is still possible to modify the technical solutions described in the embodiments, or to replace some or all of the technical features with their equivalents, but those modifications or equivalents do not deviate from the essence of the corresponding technical solutions and are still within the scope of the technical solutions of the embodiments of the disclosure.

What is claimed is:

1. A grease injection system, comprising:
   a plurality of grease injection devices, each comprising:
   a grease injection element;
   a grease injection communication element configured to receive control information; and
   a grease injection control element coupled to the grease injection element and the grease injection communication element and configured to control the grease injection element with control information to output lubricating grease, detect an operational status of the grease injection element to provide status information, and control the grease injection communication element to output the status information; and
   a host configured to communicate bidirectionally with the grease injection devices, so as to receive a plurality of pieces of status information from the grease injection devices, and generate a plurality of corresponding pieces of control information based on the pieces of status information,
   wherein a communication range of a first grease injection device of the grease injection devices covers communication ranges of the host and a second grease injection device of the grease injection devices, and
   the first grease injection device forwards control information from the host to the second grease injection device, and forwards status information of the second grease injection device to the host.

2. The grease injection system according to claim 1, wherein the grease injection communication element is in wired or wireless communication with the host.

3. The grease injection system according to claim 1, wherein each of the grease injection devices further comprises:
- a first input element coupled to the grease injection control element and operated to provide an input command; and
- a first display element coupled to the grease injection control element and configured to display information corresponding to at least one of the status information and the input command.

4. The grease injection system according to claim 3, wherein the grease injection control element controls the grease injection communication element to provide the input command to the host.

5. The grease injection system according to claim 3, further comprising:
- a forwarding device corresponding to at least one grease injection device of the grease injection devices, wherein the forwarding device forwards at least one of at least one status information and at least one input command from the at least one grease injection device to the host, and forwards at least one control information from the host to the at least one grease injection device.

6. The grease injection system according to claim 5, wherein the forwarding device comprises:
- a first forwarding communication element in wired or wireless communication with a corresponding grease injection device group of at least one grease injection device group;
- a second forwarding communication element in wired or wireless communication with the host; and
- a forwarding control element coupled to the first forwarding communication element and the second forwarding communication element and configured to receive control information corresponding to the corresponding grease injection device group through the second forwarding communication element and control the first forwarding communication element to send control information corresponding to the corresponding grease injection device group to the corresponding grease injection device group.

7. The grease injection system according to claim 6, wherein the forwarding control element receives at least one of the status information and the input command from the corresponding grease injection device group through the first forwarding communication element, and controls the second forwarding communication element to send at least one of the status information and the input command to the host.

8. The grease injection system according to claim 6, wherein the forwarding device further comprises:
- a second input element coupled to the forwarding control element and operated to provide a forwarding setting command.

9. The grease injection system according to claim 8, wherein the forwarding control element assigns at least one group of the grease injection devices as the corresponding grease injection device group based on the forwarding setting command.

10. The grease injection system according to claim 8, wherein the forwarding device further comprises:
- a second display element coupled to the forwarding control element and configured to display information corresponding to the forwarding setting command.

\* \* \* \* \*